United States Patent [19]
Deiss

[11] Patent Number: 5,521,979
[45] Date of Patent: May 28, 1996

[54] PACKET VIDEO SIGNAL INVERSE TRANSPORT SYSTEM

[75] Inventor: Michael S. Deiss, Zionsville, Ind.

[73] Assignee: Thomson Consumer Electronics, Inc., Indianapolis, Ind.

[21] Appl. No.: 232,789

[22] Filed: Apr. 22, 1994

[51] Int. Cl.⁶ .......................... H04L 9/32; H04N 7/025; H04J 3/24

[52] U.S. Cl. .......................... 380/20; 380/16; 348/423; 348/465; 348/716; 370/94.1

[58] Field of Search .................... 380/16, 20, 36; 348/461, 465, 423, 716, 715; 370/94.1, 110.1

[56] References Cited

U.S. PATENT DOCUMENTS

| | | | |
|---|---|---|---|
| 4,727,579 | 2/1988 | Wright et al. | 380/20 |
| 5,168,356 | 12/1992 | Acampora et al. | 358/133 |
| 5,202,886 | 4/1994 | Rossi et al. | 370/112 |
| 5,233,654 | 8/1993 | Harvey et al. | 380/20 |
| 5,289,276 | 2/1994 | Siracusa et al. | 348/467 |
| 5,303,302 | 4/1994 | Burrows | 380/49 |
| 5,420,866 | 5/1995 | Wasilewski | 370/110.1 |
| 5,430,485 | 7/1995 | Lankford et al. | 348/423 |

OTHER PUBLICATIONS

1994 Proceedings NAB—48th Annual Broadcasting Engineering Conference Proceedings, Grand Alliance HDTV, System Specification, Draft Document, Chapter V, Transport System, pp. 1–64, Published by NAB Office of Science and Technology, Mar. 1994.

*Primary Examiner*—Gilberto Barrón, Jr.
*Attorney, Agent, or Firm*—Joseph S. Tripoli; Eric P. Herrmann; Ronald H. Kurdyla

[57] ABSTRACT

An inverse transport processor system for a TDM packet signal TV receiver includes apparatus for selectively extracting desired payloads of program component data and coupling this data to a common buffer memory data input port. A microprocessor associated with the system also couples data to the common buffer memory data input port. The respective component payloads and data generated by the microprocessor are stored in respective blocks of the common buffer memory in response to associated memory address which are applied to a memory address input port by an address multiplexer. A decryption device is included to decrypt payload data according to packet specific decryption keys. In addition a detector is included to detect payloads including entitlement data. Payloads containing entitlement data are directed via the common buffer memory to a smart card which generates the packet specific decryption keys. A memory data output port is coupled to a bus interconnected with the respective program component processors. Responsive to data requests from the respective program component processors, and data write requests from the component payload source, memory access for read and write functions is arbitrated so that no incoming program data is lost, and all component processors are serviced.

15 Claims, 6 Drawing Sheets

PACKET VIDEO SIGNAL INVERSE TRANSPORT SYSTEM

This invention relates to apparatus for processing packets of program component data from a packet video signal and extracting corresponding payloads of different program signal components, with emphasis on utilizing a common transport buffer memory.

BACKGROUND OF THE INVENTION

It is known from, for example, U.S. Pat. No. 5,168,356 and U.S. Pat. No. 5,289,276, that it is advantageous to transmit compressed video signal in packets, with respective packets affording a measure of error protection/correction. The systems in the foregoing patents transmit and process a single television program, albeit with a plurality of program components, from respective transmission channels. These systems utilize inverse transport processors to extract the video signal component of respective programs for further processing to condition the video component for reproduction. The U.S. Pat. No. 5,289,276 only discusses processing the video signal component. The U.S. Pat. No. 5,168,356 describes an inverse transport processor which separates other program components with a simple demultiplexer responsive to packet header data for distinguishing respective signal components. The separated video component is coupled to a buffer memory, while the remaining signal components are shown coupled directly to their respective processing circuitry.

It is known from U.S. Pat. No. 5,233,654, that code may be transmitted with television signals in order to provide interactive programming. This code will typically be operated upon, or executed by, a computer associated with a television receiver.

In applications where most of the program components are compressed, some buffering is needed between the transmission channel and most of the respective component processing (decompression) apparatus, thus it is desirable to couple most, if not all components to buffer memory. The data rates of different program components may vary widely between respective components as well as within respective components. Thus it is advantageous to buffer each component separately. Buffer memory for buffering compressed program component data and for processing interactive programs in general is not insignificant. In fact it can contribute significantly to the cost of a receiver system.

If the inverse transport processor resides in, for example, a set top box, the memory size and management circuitry should be kept to a minimum to keep consumer costs as low as possible. Thus it is economically desirable to utilize the same memory and memory management circuitry for program component buffering, processor house keeping, and interactive functions.

SUMMARY OF THE INVENTION

The present invention is an inverse transport processor system for a TDM packet signal receiver. The system includes apparatus for selectively extracting desired payloads of program component data and coupling this data to a common buffer memory data input port. A microprocessor generates data which is also applied to the common buffer memory data input port. The respective component payloads and data generated by the microprocessor are stored in respective blocks of the common buffer memory in response to associated memory address which are applied to a memory address input port by a address multiplexer. In a further embodiment, a decryption device is included to decrypt payload data according to packet specific decryption keys. In a still further embodiment, a detector is included to detect payloads including entitlement data. Payloads containing entitlement data are directed via the common buffer memory to a smart card which generates the packet specific decryption keys.

A data output from the memory is coupled to a bus interconnected with the respective program component processors. Responsive to data requests from the respective program component processors, and data write requests from the component payload source, memory access for read and write functions is arbitrated so that no incoming program data is lost, and all component processors are serviced.

BRIEF DESCRIPTION OF THE DRAWINGS

The invention will be described with reference to the drawings, wherein.

DETAILED DESCRIPTION

Figure 1:
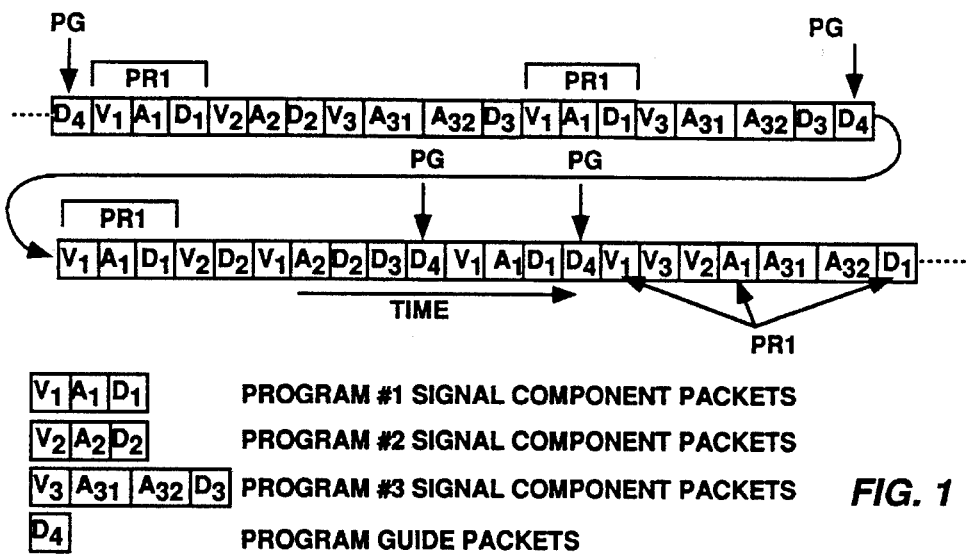
FIG. 1 is a pictorial representation of a time division multiplexed packet television signal.

FIG. 1 shows a signal stream consisting of a string of boxes which represent signal packets which are components of a plurality of different television or interactive television programs. These program components are assumed to be formed of compressed data and as such the quantity of video data for respective images is variable. The packets are of fixed length. packets with letters having like subscripts represent components of a single program. For example, $V_i$, $A_i$, $D_i$ represent video, audio and data packets and packets designated $V_1$, $A_1$, $D_1$, represent video, audio and data components for program 1, and $V_3$, $A_{31}$, $A_{32}$, $D_3$, represent video, audio 1, audio 2 and data components of program 3. The data packets $D_i$ may contain e.g. control data to initiate certain action within a receiver, or they may include executable code forming an application to be executed by e.g., a microprocessor located within or associated with a receiver.

In the upper line of the string of packets the respective components of a particular program are shown grouped together. However there is no necessity of packets from the same program being grouped as is indicated by the entire string of packets. Nor is there any particular order for the sequence of occurrence of respective components.

Figure 2:
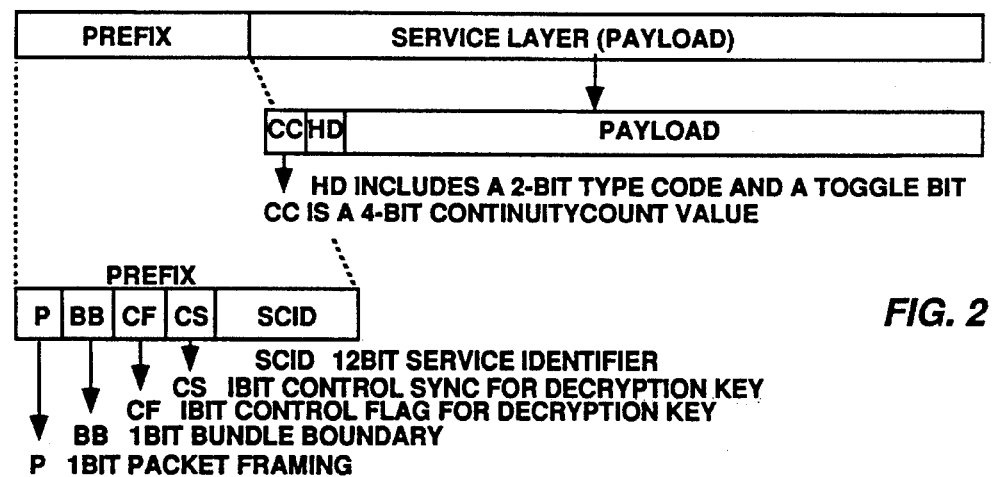
FIG. 2 is a pictorial representation of respective signal packets.

The respective packets are arranged to include a prefix and a payload as shown in FIG. 2. The prefix of this example includes two 8-bit bytes comprising five fields, four (P, BB, CF, CS) of which are 1-bit fields, and one (SCID) of which is a 12-bit field. The SCID field is the signal component identifier. The field CF contains a flag to indicate whether the payload of the packet is scrambled, and the field CS contains a flag which indicates which of two alternative unscrambling keys is to be utilized to unscramble scrambled packets. The prefix of every packet is packet aligned, thus the location of the respective fields are easily identifiable.

Within every payload is a header which contains a continuity count, CC, modulo 16, and a TOGGLE flag bit which are program component specific. The continuity count is simply a successive numbering of successive packets of the same program component. The TOGGLE flag bit is a one bit signal which, for the video component, changes logic level or toggles in packets defining the beginning of a new picture (frame), i.e., packets which contain a picture layer header.

Figure 3:
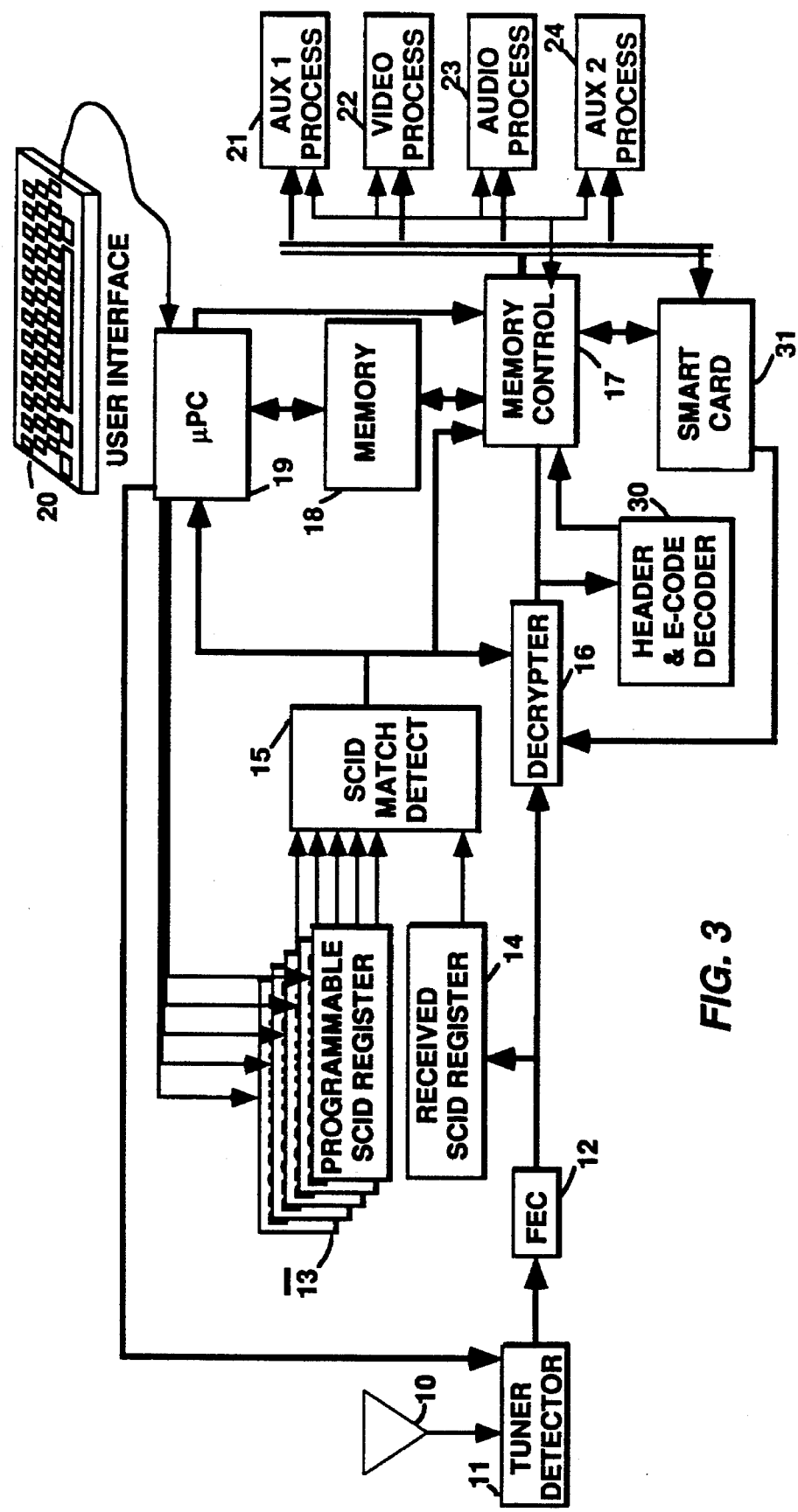
FIG. 3 is a block diagram of a receiver for selecting and processing packets of multiplexed component signals embodying the present invention.

FIG. 3 illustrates in block form, a portion of digital television signal receiver including elements of an inverse transport processor. Signal is detected by an antenna 10 and applied to a tuner detector, 11, which extracts a particular frequency band of received signals, and provides baseband compressed signal in a binary format. The frequency band is selected by the user through a microprocessor 19 by conventional methods. Nominally broadcast digital signals will have been error encoded using, for example, Reed-Solomon forward error correcting (FEC) coding. The baseband signals will thus be applied to a FEC decoder, 12. The FEC decoder 12 synchronizes the received video and provides a stream of signal packets of the type illustrated in FIG. 1. The FEC 12 may provide packets at regular intervals, or on demand, by for example, memory controller 17. In either case a packet framing or synchronizing signal is provided by the FEC circuit, which indicates the times that respective packet information is transferred from the FEC 12.

The detected frequency band may contain a plurality of time division multiplexed programs in packet form. To be useful, only packets from a single program should be passed to the further circuit elements. In this example it is assumed that the user has no knowledge of which packets to select. This information is contained in a program guide, which in itself is a program consisting of data which interrelates program signal components through SCID's, and may include information relating to, for example, subscriber entitlements. The program guide is a listing for each program, of the SCID's for the audio, video, and data components of respective programs. The program guide (packets D4 in FIG. 1) is assigned a fixed SCID. When power is applied to the receiver, the microprocessor 19 is programmed to load the SCID associated with the program guide into one of a bank of similar programmable SCID registers 13. The SCID fields of the prefix portion of respective detected packets of signal from the FEC 12 are successively loaded in a further SCID register 14. The programmable registers and the received SCID register are coupled to respective input ports of a comparator circuit 15, and the received SCID is compared with the program guide SCID. If the SCID for a packet matches the program guide SCID, the comparator 15 conditions a memory controller 17 to route that packet to a predetermined location in the memory 18 for use by the microprocessor. If the received SCID does not match the program guide SCID, the corresponding packet is simply dumped.

The microprocessor waits for a programming command from the user via an interface 20, which is shown as a computer keyboard, but which may be a conventional remote control, or receiver front panel switches. The user may request to view a program provided on channel 4 (in the vernacular of analog TV systems). The microprocessor 19 is programmed to scan the program guide list that was loaded in the memory 18 for the respective SCID's of the channel 4 program components, and to load these SCID's in respective other ones of the programmable registers of the bank of registers 13 which are associated with corresponding component signal processing paths.

Received packets of audio, video or data program components, for a desired program, must ultimately be routed to the respective audio 23, video 22, or auxiliary data 21, (24) signal processors respectively. The data is received at a relatively constant rate, but the signal processors nominally require input data in bursts (according to the respective types of decompression for example). The exemplary system of FIG. 3, first routes the respective packets to predetermined memory locations in the memory 18. Thereafter the respective processors 21–24 request the component packets from the memory 18. Routing the components through the memory provides a measure of desired signal data rate buffering or throttling.

The audio, video and data packets are loaded into respective predetermined memory locations to enable the signal processors convenient buffered access to the component data. In order that the payloads of respective component packets get loaded in the appropriate memory areas, the respective SCID comparators are associated with those memory areas. This association may be hardwired in the memory controller 17, or the association may be programmable. If the former, specific ones of the programmable registers 13 will always be assigned the audio, video and data SCID's respectively. If the latter the audio, video and data SCID's may be loaded in any of the programmable registers 13, and the appropriate association will be programmed in the memory controller 17 when the respective SCID's are loaded in the programmable registers.

In the steady state, after the program SCID's have been stored in the programmable registers 13, the SCID's of received signal packets are compared with all of the SCID's in the programmable SCID registers. If a match is made with either a stored audio, video or data SCID, the corresponding packet payload will be stored in the audio, video or data memory area or block respectively.

The respective signal packets are coupled from the FEC 12 to the memory controller 17 via a signal decryptor 16. Only the signal payloads are scrambled and the packet headers are passed by the decryptor unaltered. Whether or not a packed is to be descrambled is determined by the CF flag in the packet prefix, and how it is to be descrambled is determined by the CS flag. If no SCID match is had for a respective packet, the decryptor may simply be disabled from passing any data.

The decryptor is programmed with decryption keys provided by the smart card apparatus 31. The smart card is responsive to entitlement information contained in particular packets of the program guide to generate appropriate decryption keys. The system of the present example incorporates two levels of encryption or program access, entitlement control messages, ECM's, and entitlement management messages, EMM's. Program entitlement control and management information is regularly transmitted in packets identifiable with specific SCID's included in the packet stream comprising the program guide. The ECM information contained in these packets is used by the smart card to generate the decryption keys used by the decryptor. The EMM information included in these packets is used by the subscriber specific smart card to determine program material to which the subscriber is entitled. EMM entitlement information within these packets may be made geographically specific, or group specific or subscriber specific. For example, the present system will include a modem (not shown) for communicating billing information from the smart card to the program provider, e.g., the satellite broadcaster. The smart card may be programmed with, for example, the area code and telephone exchange of the receiver location. The EMM may include data, which when processed by the smart card, will entitle or deny reception of particular programs in particular area codes.

The program provider may want the ability to black out particular areas or groups with very short lead time. For example, a broadcaster may be required to black out a football game in the area local to the stadium, if the tickets for the game are not sold out. This information is not available until immediately before game time. With such short lead time it may not be possible to program EMM's to black out the local area. A further coding of the entitlement information is included within payloads of entitlement data to allow instant blackout.

Packets containing the entitlement data include a payload header of 128 bits arranged in specially coded 4 groups of 32 bits. A matched filter or E-code decoder 30, is arranged to detect certain combinations of bit patterns within the 128 bit header. If a match is detected the decoder communicates with the memory controller 17 and the smart card 31 to make the remainder of the entitlement payload available to the smart card (via the memory 18). If a match is not detected, the payload is not accepted by the specific receiver. The special codes may be periodically changed if the matched filter 30 is made programmable. These codes may be periodically provided by the smart card. For more specific details on smart card operation as related to viewer entitlements the reader is invited to review Section 25 of THE SATELLITE BOOK, A COMPLETE GUIDE TO SATELLITE TV THEORY AND PRACTICE, Swift Television Publications, 17 Pittsfield, Cricklade, Wilts, England.

The matched filter or E-code decoder is arranged to perform a second function, which is to detect particular MPEG video headers. These headers or start codes are 32 bits in length, (which is the reason the headers of entitlement payloads are coded in 32-bit groups). If video data is lost, an MPEG video decoder can only restart decompressing video data at particular data entry points. These entry points coincide with MPEG start codes. The decoder may be arranged to communicate with the memory controller 17 to inhibit the flow of video data to memory after video packet losses, and to resume writing video payloads to memory only after the next MPEG start code is detected by the decoder 30.

Figure 4:
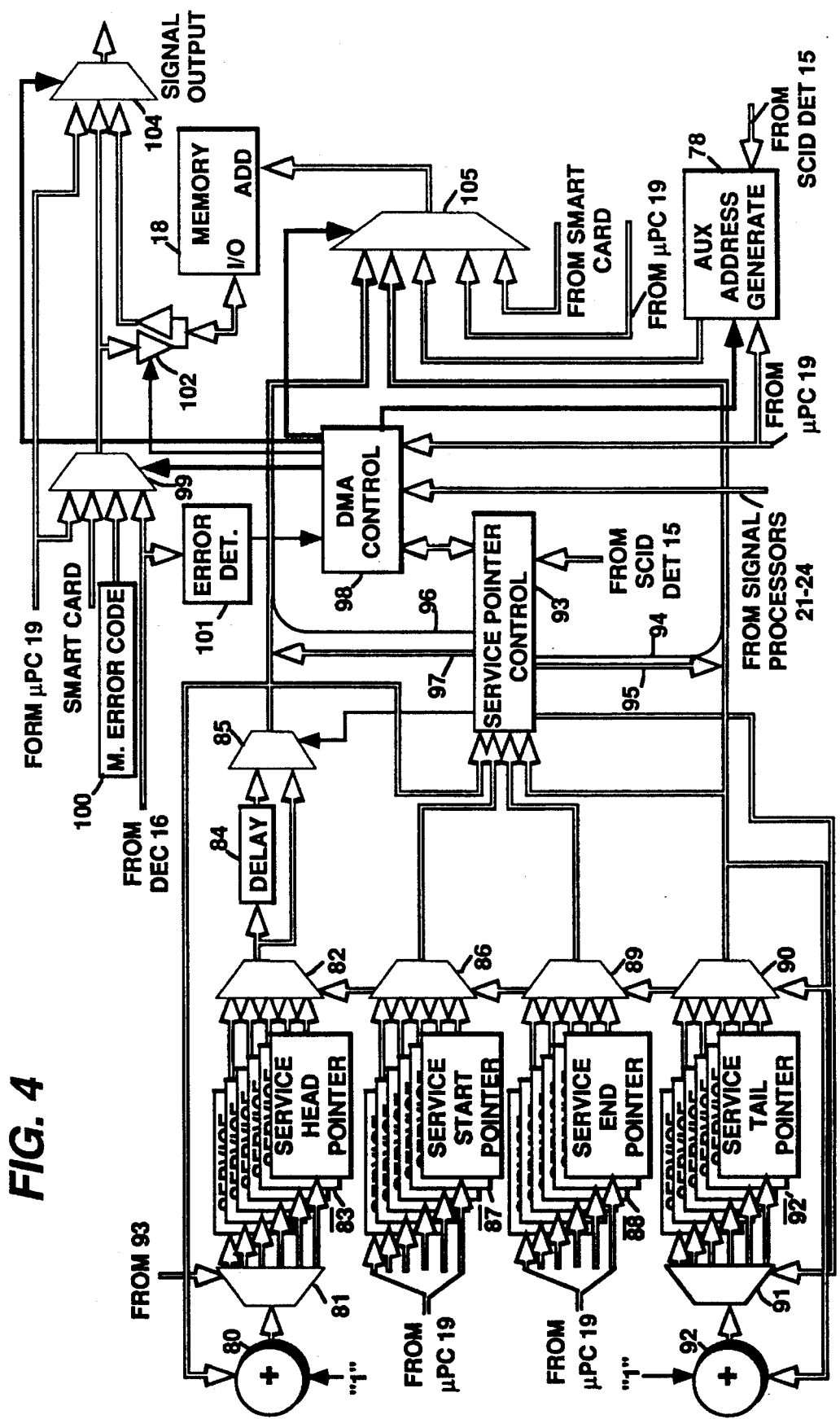
FIG. 4 is a block diagram of exemplary memory management circuitry which may be implemented for element 17 of FIG. 3.

FIG. 4 illustrates exemplary apparatus for the memory controller 17 shown in FIG. 3. Each program component is stored in a different contiguous block of the memory 18. In addition other data, such as data generated by the microprocessor 19 or a Smart Card (not shown) may be stored in the memory 18.

Addresses are applied to the memory 18 by a multiplexor 105, and input data is applied to the memory 18 by a multiplexor 99. Output data from the memory management circuitry is provided to the signal processors by a further multiplexor 104. Output data provided by the multiplexor 104 is derived from the microprocessor 19, the memory 18 or directly from the multiplexor 99. Program data is presumed to be of standard picture resolution and quality, and occurring at a particular data rate. On the other hand high definition television signals, HDTV, which may be provided by this receiver, occur at a significantly higher data rate. Practically all data provided by the FEC will be routed through the memory 18 via the multiplexor 99 and memory I/O circuit 102, except for the higher rate HDTV signals which may be routed directly from the multiplexer 99 to the multiplexor 104. Data is provided to the multiplexer 99 from the decryptor 16, the smart card circuitry, the microprocessor 19, and a source of a media error codes 100. The term media error codes as used herein, means special codewords to be inserted in a data stream, to condition the respective signal processor (decompressor) to suspend processing until detection of a predetermined codeword such as a start code, and then to resume processing in accordance with the e.g. start code.

Memory addresses are provided to the multiplexor 105, from program addressing circuitry 79-97, from the microprocessor 19, from the Smart Card apparatus 31 and from the auxiliary packet address counter 78. Selection of the particular address at any particular time period is controlled by a direct memory access DMA, circuit 98. The SCID control signals from the comparator 15 and "data needed" signals from respective signal processors are applied to the DMA 98, and responsive thereto, memory access contention is arbitrated. The DMA 98 cooperates with a Service Pointer Controller 93, to provide the appropriate read or write addresses for respective program signal components.

The respective addresses for the various signal component memory blocks are generated by four groups of program component or service pointer registers 83, 87, 88, and 92. The starting pointers for respective blocks of memory, into which respective signal components are stored, are contained in registers 87 for the respective signal components. The start pointers may be fixed values, or they may be calculated by conventional memory management methods in the microprocessor 19.

The last address pointers for respective blocks are stored in the bank of service registers 88, one for each potential program component. Similar to the start addresses, the end addresses may be fixed values or they may be calculated values provided by the microprocessor 19. Using calculated values for starting and end pointers is preferred because it provides a more versatile system with less memory.

The memory write pointers or head pointers are generated by the adder 80 and the service head registers 83. There is a service head register for each potential program component. A write or head pointer value is stored in a register 83, and provided to the address multiplexor 105 during a memory write cycle. The head pointer is also coupled to the adder 80, wherein it is incremented by one unit, and the incremented pointer is stored in the appropriate register 83 for the next write cycle. The registers 83 are selected by the service pointer controller, 93, for the appropriate program component currently being serviced.

In this example it is assumed that the start and end pointers are 16-bit pointers. The registers 83 provides 16 bit write or head pointers. 16-bit pointers were selected to facilitate use of 16-bit or 8-bit busses for loading the start and end pointers in the registers 87 and 88. The memory 18, on the other hand, has 18-bit addresses. The 18-bit write addresses are formed by concatenating the two most significant bits of the start pointers to the 16-bit head pointers, with the start pointer bits in the most significant bit positions of the combined 18-bit write address. The start pointers are provided by the respective registers 87 to the service pointer controller 93. The service pointer controller parses the more significant start pointer bits from the start pointers stored in registers 87, and associates these bits with the 16-bit head pointer bus. This is illustrated by the bus 96 shown being combined with the head pointer bus exiting the multiplexor 85, and by FIG. 5 with reference to the bold arrows.

Figure 5:
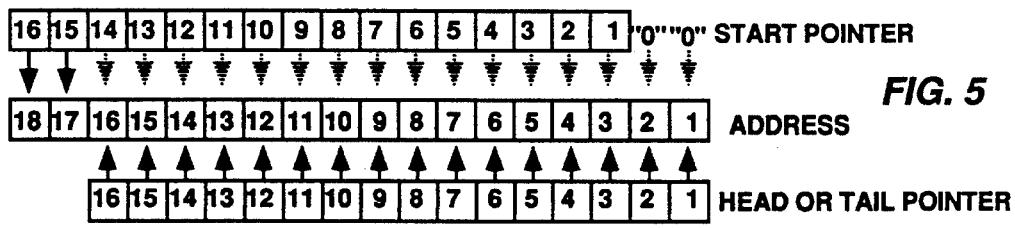
FIG. 5 is a pictorial representation showing memory address formation for service channel data.

In FIG. 5, the top middle and bottom rows of boxes represent the bits of a start pointer, an address and a head or tail pointer respectively. The higher numbered boxes represent more significant bit positions. The arrows indicate from which bit positions of the start or head/tail pointers the respective bits of an address are derived. In this derivation the bold arrows represent steady state operation.

Similarly, memory read pointers or tail pointers are generated by the adder 79 and the service tail registers 92. There is a service tail register for each potential program component. A read or tail pointer value is stored in a register 92, and provided to the address multiplexor 105 during a memory read cycle. The tail pointer is also coupled to the adder 79, wherein it is incremented by one unit, and the incremented pointer is stored in the appropriate register 92 for the next read cycle. The registers 92 are selected by the service pointer controller, 93, for the appropriate program component currently being serviced.

The registers 92 provides 16 bit tail pointers. 18-bit read addresses are formed by concatenating the two most significant bits of the start pointers to the 16-bit tail pointers, with the start pointer bits in the most significant bit positions of the combined 18-bit write address. The service pointer controller parses the more significant start pointer bits from the start pointers stored in registers 87, and associates these bits with the 16-bit tail pointer bus. This is illustrated by the bus 94 shown being combined with the tail pointer bus exiting the multiplexor 90.

Data is stored in the memory 18 at the calculated address. After storing a byte of data, the head pointer is incremented by one and compared to the end pointer for this program component, and if they are equal the more significant bits of the head pointer are replaced with the lower 14 bits of the start pointer and zeros are placed in the lower two bit positions of the head pointer portion of the address. This is illustrated in FIG. 5 with reference to the hatched arrows between the start pointers and the address. This operation is illustrated by the arrow 97 pointing from the service pointer controller 93 to the head pointer bus from the multiplexor 85. It is presumed that application of the lower 14 start pointer bits override the head pointer bits. Replacing the head pointer bits with the lower start pointer bits in the address for this one write cycle, causes the memory to scroll through the memory block designated by the upper two start pointer bits, thus obviating reprogramming write addresses at the start of each packet to a unique memory location within a block.

If the head pointer ever equals the tail pointer (used to indicate where to read data from the memory 18) a signal is sent to the interrupt section of the microprocessor to indicate that a head tail crash has occurred. Further writing to the memory 18 from this program channel is disabled until the microprocessor re-enables the channel. This case is very rare and should not occur in normal operation.

Data is retrieved from the memory 18 at the request of the respective signal processors, at addresses calculated by the adder 79 and registers 92. After reading a byte of stored data, the tail pointer is incremented by one unit and compared to the end pointer for this logical channel in the service pointer controller 93. If the tail and end pointers are equal then the more significant bits of the tail pointer are replaced with the lower 14 bits of the start pointer and zeros are placed in the lower two bit positions of the tail pointer portion of the address. This is illustrated by the arrow 95 emanating from controller 93 and pointing to the tail pointer bus from the multiplexor 90. If the tail pointer is now equal to the head pointer, then the respective memory block is defined as empty and no more bytes will be sent to the associated signal processor until more data is received from the FEC for this program channel. The actual replacement of the head or tail pointer portions of the respective write or read addresses by the lower 14 bits of the start pointer may be accomplished by appropriate multiplexing, or the use of three state interconnects.

Figure 6:
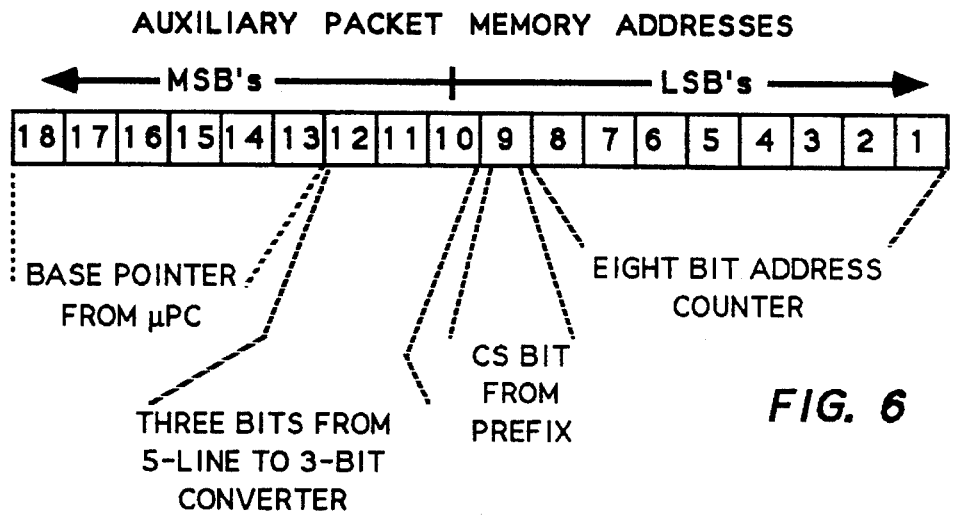
FIG. 6 is a pictorial representation showing memory address formation for auxiliary packet data.

Data transmitted in auxiliary packets is typically directory, header or control information and thus is processed slightly differently from program component data. Data in the auxiliary packets include information necessary to establish the requisite memory storage areas for the respective program components and any included applications. As such auxiliary packets are given preference. Two service blocks are provided for each component. Each block has an eight bit sequential address or storage locations for 256 bytes of data. Each block has an eighteen bit total address which is illustrated in FIG. 6. The eight LSB's of the address are provided by a sequential counter. The ninth bit is provided by the CS or scramble key bit from the transport prefix. The tenth through twelfth bits are generated responsive to the particular SCID's assigned for program detection. This example assumes that the system has provision for processing and detecting five program components (including program guide) or services. There are thus five SCID's programmed in the respective programmable SCID registers 13 and five SCID comparators, 15. The five comparators each have an output terminal, which terminal is assigned a program component. The five possible programs that are associated with the five comparator output terminals are assigned respective three bit codes, three bits being the fewest number of bits that can represent five states. The three bit codes are inserted as the tenth through twelfth bits of the auxiliary packet addresses. Assume that SCID's for five respective program components are assigned to programmable registers arbitrarily numbered 1–5. The three bit codes assigned to the components assigned to the programmable registers 1–5 are 000, 001, 010, 011, and 100 respectively. Depending upon which program component is currently being detected, the three bit code associated with the programmable register containing the current program component SCID, will be inserted into the tenth through twelfth bit positions in the memory write address.

The six most significant bits of the 18 bit auxiliary addresses are provided by the microprocessor according to conventional memory management techniques.

Figure 7:
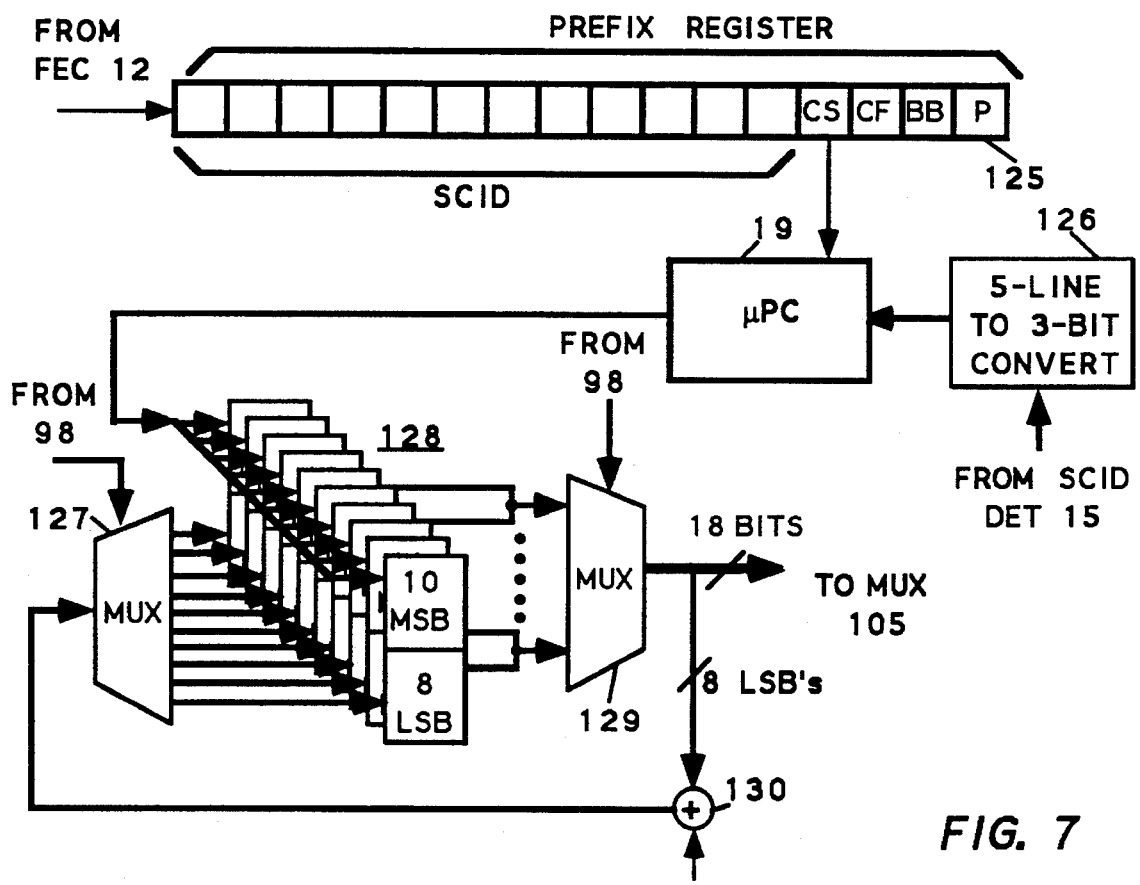
FIG. 7 is a block diagram of exemplary circuitry for generating auxiliary packet memory addresses.

FIG. 7 illustrates exemplary auxiliary memory address generating circuitry. FIG. 7 includes a prefix register 125 used for capturing the prefix bit CS, which is applied to the microprocessor 19. The five control lines from the SCID detector 15 are applied to a five control line to three bit converter 126, which may be a simple Boolean logic operator. The three bits generated by the converter 126 are applied to the microprocessor 19 which composes respective 10 most significant bit (MSB) portions of auxiliary addresses. On detection of an auxiliary packet, the 10-MSB address portion is applied to the MSB portion of one of a bank of registers 128. The 8-LSB portion of the respective register 128 is set to a predetermined value, typically zero, at the beginning of each auxiliary packet. The 8-LSB portion is appended to the 10-MSB portion and applied to an input port of a 10-to-1 multiplexer 129. The 8-LSB portion of respective addresses provided by the multiplexer 129 are coupled to an adder 130, wherein the 8-LSB address value is incremented by one unit and coupled back into the 8-LSB portion of the register 128 via a further multiplexer 127. The incremented LSB portion (with its MSB portion) serves as the next successive address for the respective auxiliary packet. The multiplexers 127 and 129 are controlled by the DMA controller 98 for selecting the current memory block to be addresses.

Auxiliary packets are typically processed independently and an entire auxiliary packet payload is typically loaded in memory before it can be utilized. As such, the block of memory being addressed for writing a current auxiliary packet thereto, will not normally be addressed concurrently for read and write purposes. Therefor the same registers may be used for read and write addressing. Once an auxiliary packet is stored in a respective block of memory, the 8-LSB portion is reset to the predetermined starting address in preparation for data readout. In an alternative arrangement, a parallel bank of registers, multiplexers and an adder similar to elements 127–130 may be configured for generating read addresses. These read addresses may be time division multiplexed with a further multiplexer in cascaded connection with the multiplexer 129.

Memory read/write control is performed by the service pointer controller and direct memory access, DMA, elements 93 and 94. The DMA is programmed to schedule read and write cycles. Scheduling is dependent upon whether the FEC 12 is providing data to be written to memory or not. FEC data write operations take precedence so that no incoming signal component data is lost. In the exemplary apparatus illustrated in FIG. 4, there are four types of apparatus which may access the memory. These are Smart Card (not shown), the FEC 12 (more precisely the decryptor 16), the microprocessor 19 and the application devices such as the audio and video processors. Memory contention is handled in the following manner. The DMA, responsive to data requests from the various processing elements listed above, allocates blocks of memory for respective program components. Access to the memory is provided in 95 nS time slots during which a byte of data is read from or written to the memory 18. There are two major modes of access allocation, defined by "FEC Providing Data", or "FEC Not Providing Data" respectively. For each of these modes the time slots are allocated and prioritized as follows, assuming a maximum FEC data rate of 5 Mbytes/second, or one byte for each 200 nS. These are:

FEC Providing Data
  1) FEC data write;
  2) Application device read/Microprocessor read/write;
  3) FEC data write;
  4) Microprocessor read/write;
and for
FEC Not Providing Data
  1) Smart Card read/write;
  2) Application device read/Microprocessor read/write;
  3) Smart Card read/write;
  4) Microprocessor read/write.

Because FEC data writes cannot be deferred, the FEC (or more correctly the decryptor), when providing data must be guaranteed memory access during each 200 nS interval. Alternate time slots are shared by the application devices and the microprocessor. When there is no data available for the requesting devices, the microprocessor is provided use of the application time slots.

The Controller 93 communicates with the SCID detector to determine which of the respective Start, head and end pointer registers to access for memory write operations. The controller 93 communicates with the DMA to determine which of the start, end and tail registers to access for memory read operations. The DMA 98 controls selection of the corresponding addresses and data by the multiplexers 99, 104 and 105.

Figure 8:
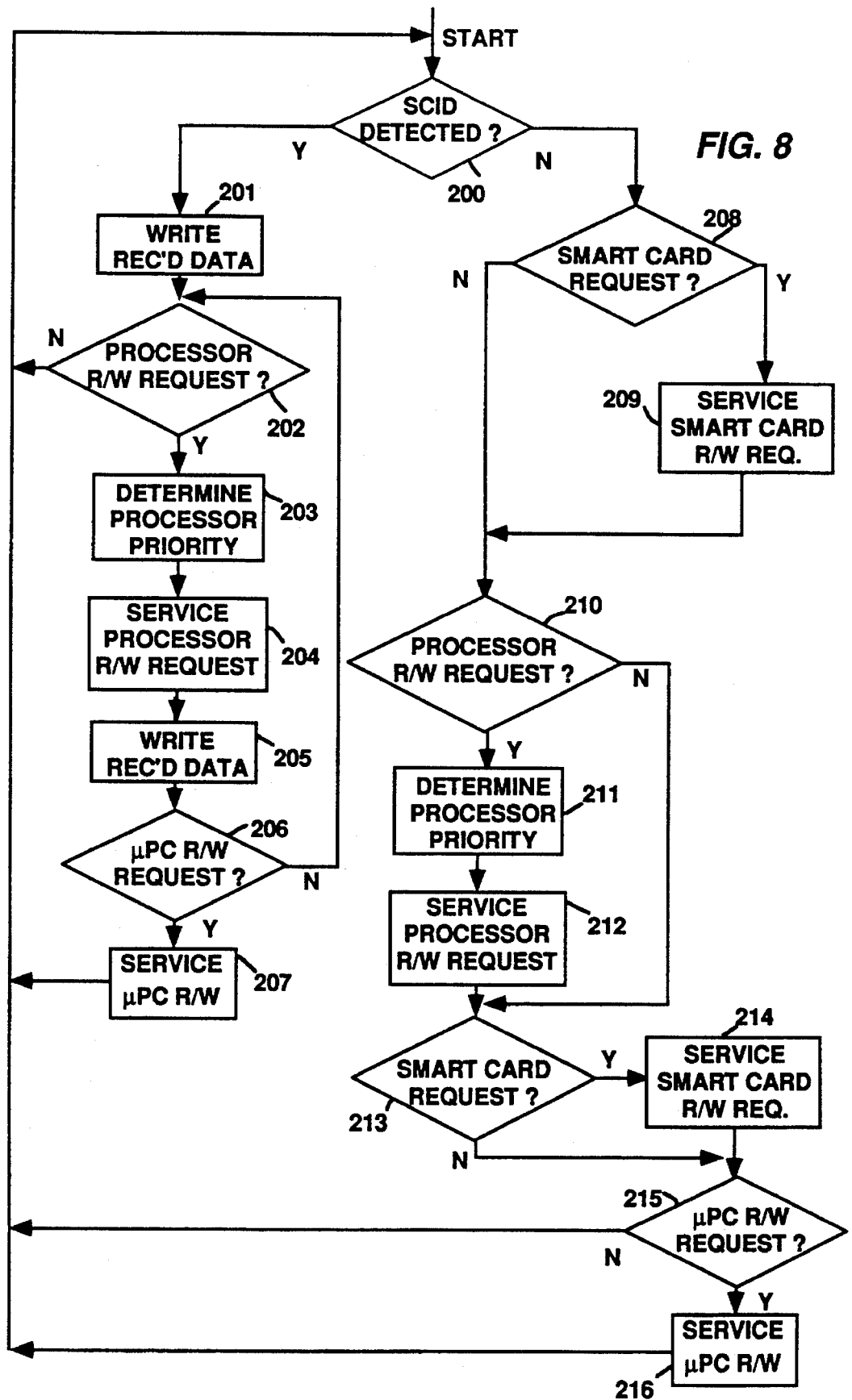
FIG. 8 is a flow chart of operation of the memory address control.

FIG. 8 illustrates an exemplary flow chart of the DMA 98 memory access process. The DMA responds {200} to detection or non detection of a received packet via detection of SCID's. If a SCID has been detected indicating the presence of data from the decryptor 16 to be written to memory, one byte of program data from the decryptor is written {201} to the buffer memory 18. The block of memory to which it is written is determined by the processor 93 responsive to the current SCID. Next the DMA determines {202} if any of the program component processors, including the smart card and μPC are requesting data or read/write (R/W) access to the memory 18. If no data requests are made on the D MA the process returns to step {200}. If a data R/W request has been made, the DMA determines {203} the priority of the request. This will be accomplished by a conventional interrupt routine or alternatively sequential one byte service in an arbitrary order of those program processors requesting data. For example, assume that an arbitrary order of access priority is video, audio I, audio II. smart card, and μPC. Assume also that only the video, audio II and μPC are requesting memory access. During the current operation of step {203} a byte of video will be read from memory. During the next operation of step {203} a byte of audio II will be read from memory, and During the next subsequent occurrence of step {203} a byte of μPC data will be written to- or read from memory 18 and so forth. Note that address for smart card and μPC access are provided by the smart card and μPC respectively, but addresses for video, audio and program guide are available from the address pointer arrangement (80–93).

Once priority access has been established {203}, the requisite program processor is serviced {204} with one byte of data written to- or read from memory 18. Next a byte of data from the decryptor 16 is written {205} to memory. A check {206} is made to determine if the μPC is requesting access. If the μPC is requesting access, it is serviced {207} with one byte of data. If the μPC is not requesting access the process jumps to step {202} to determine if any of the program processors are requesting access. In this manner the incoming data is always guaranteed access to every other memory access period, and the intervening memory access periods are spread amongst the program processors.

If data is not presently available from the decryptor 16, i.e. an SCID is not currently detected, the process {208–216} is followed. First {208} the smart card is examined to determine if it is requesting memory access. If it is, it is given a one byte memory access {209}, else a check is made {210} to determine if any of the program processors is requesting memory access. If a data R/W request has been made, the DMA determines {211} the priority of the request. The appropriate processor is serviced {212} with a one byte memory read or write access. If a data R/W request has not been made by the program processors, the process jumps to step {213} where a test is performed to determine if the smart card is requesting memory access. If it is it is serviced {216} with a one byte memory access, else the process jumps to step {200}.

It should be recognized that in the present preferred example, when in the "FEC Not Providing Data" mode, the smart card is provided a two-to-one access precedence over all other program processors. This priority is programmed into a programmable state machine within the DMA apparatus and is subject to being changed by the μPC. As mentioned earlier, the system is intended to provide interactive services, and the μPC 19 will be responsive to interactive data to perform at least in part the interactive operation. In this role, the μPC 19 will use the memory 18 both for application storage and working memory. In these instances, the system operator may change the memory access priority to provide the μPC 19 with memory access of greater frequency. The reprogramming of memory access priority may be included as a subset of interactive application instructions.

It is advantageous to insert media error codes into the video component signal stream when packets are lost, to condition the video signal decompressor to suspend decompression until a particular signal entry point occurs in the data stream. It is not practical to predict where and in which video packet the next entry point may occur. In order to find the next entry point as fast as possible, it is necessary to include a media error code at the beginning of the first video packet after detection that a packet is lost. The circuitry of FIG. 4 places a media error code at the beginning of every video packet and then excises the media error code in respective packets if there is no loss of a preceding packet. The media error code is inserted in the first M memory address locations reserved for the current video packet payload, by writing to memory 18 for M write cycles prior to the video payload arriving from the decryptor. Concurrently the multiplexor 99 is conditioned by the DMA 98, to apply the media error code from the source 100 to the memory 18 I/O. M is simply the integer number of memory locations required to store the media error code. Assuming the memory to store 8-bit bytes, and the media error code to be 32 bits, M will equal 4.

The addresses for loading the media error code in memory are provided by the respective video component service register 83 via the multiplexer 82 and multiplexer 85. It will be appreciated that the first M addresses provided from the pointer register 83 for loading the media error code into the memory locations that would otherwise be loaded with video component data, will simply be the next M sequential addresses that would normally be produced by the video head pointer. These same addresses are coupled into an M-stage delay element 84, so that immediately after the last byte of the media error code is stored in the memory 18, the first of the M addresses is available at the output of the delay element 84.

Packet error or loss detection is performed by an error detector 101 which is responsive to the CC and HD data of the current packet. The detector 101 examines the continuity count CC in the current packet to determine if it differs from the CC of the previous packet by one unit. In addition the TOGGLE bit in the current packet is examined to determine if it exhibits the proper state for the respective video frame. If the CC value is incorrect, the state of the TOGGLE bit is examined. Depending if one or both of the CC and TOGGLE bit are in error, first or second modes of error remediation are instituted. In the first mode, where only the CC is erroneous, the system is conditioned to reset to a packet containing a slice layer header. (A slice layer is a subset of compressed data within a frame.) In the second mode, initiated by both CC and TOGGLE bits being erroneous, the system is conditioned to reset to a packet containing a picture layer header. In both the first and second modes, the media error code written to memory is retained in the respective payload to alert the decompressor to institute remedial action.

If a packet loss is detected, the video component of the current packet is stored in memory 18, starting at the next or $(M+1)^{th}$ address location. This is accomplished by conditioning the multiplexer 85 to continue to pass undelayed head pointers from the appropriate register 83. Alternatively, if a packet loss is not detected, the first M bytes of the video component in the current packet are stored in the memory locations in which the media error code was immediately previously stored. This is accomplished by the service pointer controller conditioning the multiplexer 85 to pass the delayed head pointers from the delay element 84, for M write cycles. At the end of the M write cycles the service pointer controller 93 will condition the multiplexer to again pass undelayed head pointers. When the multiplexer switches back to non delayed pointers, the next non delayed pointer will correspond to the $M+1^{th}$ address.

Depending upon the particular designs of a given receiver, it may or may not be conducive to include media error codes in different ones of the signal components when respective component transport packets are lost. In addition it may be advantageous to utilize different media error codes for different signal component formats or compression processes. Thus one or more media error code sources may be required.

Figure 9:
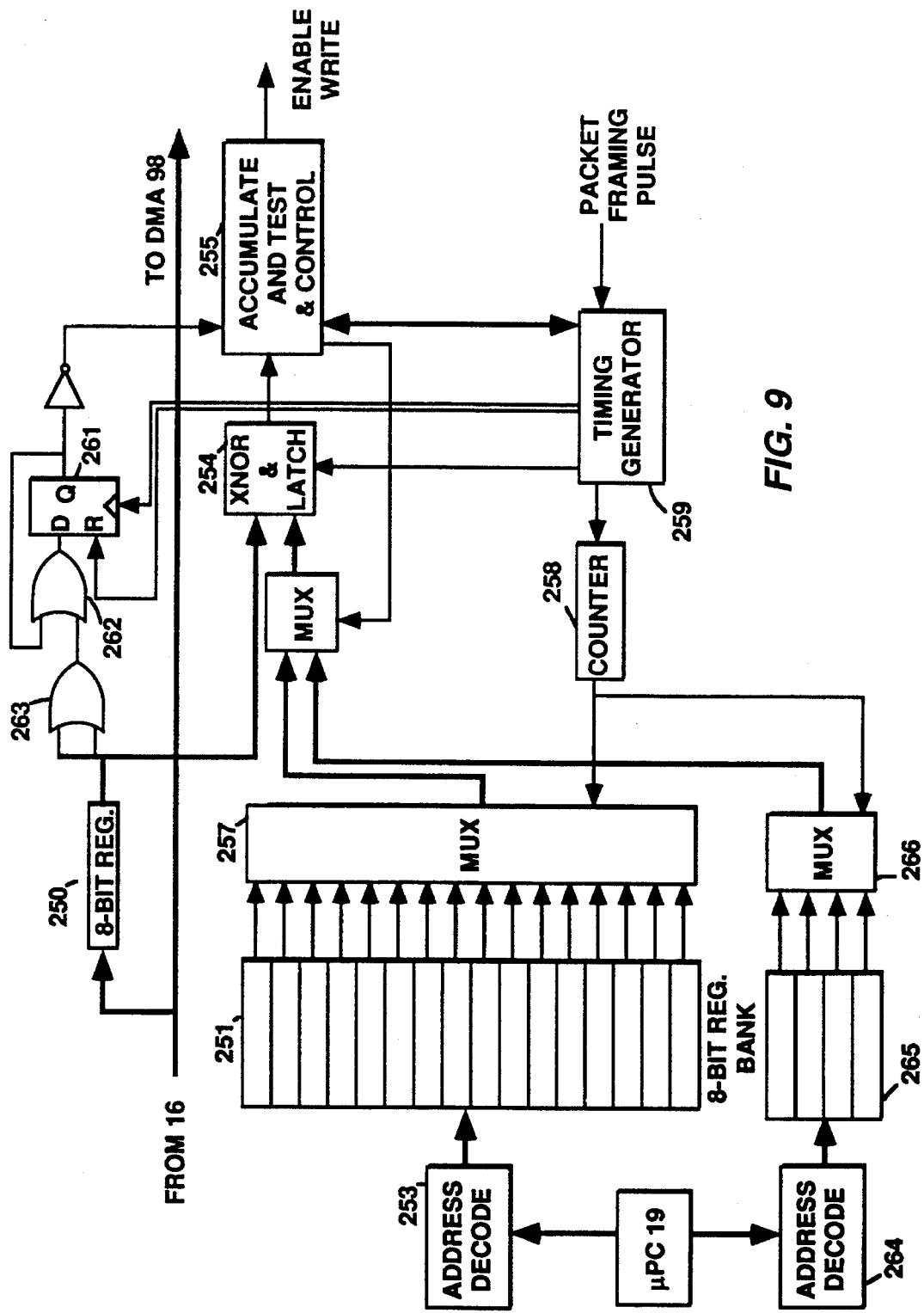
FIG. 9 is a block diagram of a conditional access filter/start code detector.

FIG. 9 illustrates exemplary apparatus for detecting packets which include conditional access information or MPEG start codes (decoder 30 of FIG. 3). Whether the decoder 30 is conditioned to detect entitlement payloads or MPEG start codes is a function of the SCID currently being received. In FIG. 9, it is assumed that data provided from the decryptor 16 is in 8-bit bytes and packet aligned. That is, the first byte of an entitlement payload or the first byte of an MPEG start code is aligned precisely with the beginning of a packet payload, such that for detecting specific header or start codewords, their position in the bit/byte stream is precisely known. Data from the decryptor 16 is applied to an 8-bit register 250, which has an 8-bit parallel output port coupled to respective first input connections of a comparator 254 which may be configured of, for example, a bank of eight exclusive NOR (XNOR) circuits having respective output connections coupled to an AND gate and a latch. The latch may be a data latch arranged to latch the results of the AND gate at each byte interval.

A 32-bit MPEG start code is stored as four bytes in an 8-bit register bank 265. Entitlement header codes are stored as 8-bit bytes in a bank of 16 8-bit registers 257. Loading of the register banks 251 and 265 is controlled by the microprocessor 19 and/or by the smart card. The start code registers 265 are coupled to a four to one multiplexer 266, and the entitlement header registers are coupled to sixteen to one multiplexer 257. Output ports of the multiplexers 257 and 266 are coupled to a two to one multiplexer 249. Respective output connections of the multiplexer 249 are coupled to respective corresponding second input terminals of the comparator 254. Note the input and output connections of the multiplexers 249, 257 and 266 are 8-bit busses. If the respective values exhibited at the respective output connections of the register 250 are correspondingly the same as the output values exhibited by the respective output connections of the multiplexer 249, a true signal is generated by the comparator 254 circuit for the corresponding data byte.

For start code detection, the multiplexer 266 is scanned by the counter 258 to sequentially couple the four different registers 265 to the XNOR in synchronism with the occurrence of the first four data bytes from the decryptor 16. Alternatively, for entitlement payload header detection, the multiplexer 257 is scanned by the counter 258 to sequentially couple different ones of the registers 265 to the comparator circuit.

The output of the comparator circuit is applied to an accumulate and test circuit 255. The circuit 255 determines if any of a predetermined number of byte matching conditions have occurred, and if they have, it generates a write enable signal for the entitlement data in a portion of the particular payload under examination. In the present system the entitlement payload header contains 128 bits arranged in four 32-bit segments. Different subscribers will be arranged to look for different combinations of bytes of the 128 bits. For example one subscriber apparatus may be arranged to match the first four bytes of the entitlement payload header. Another subscriber apparatus may be arranged to match the second four bytes of the entitlement payload header and so forth. In either of these exemplary situations the circuitry 255 will determine if a match has occurred for the appropriate four consecutive bytes.

The FIG. 9 apparatus also includes circuitry (elements 261–263) for detecting an all zero entitlement payload header condition. The bits of respective arriving bytes of data are coupled to respective terminals of the 8-bit OR gate 263. If any one of the bits is a logic one the OR gate 263 generates a logic one output. The output of the OR gate 263 is coupled to one input of a two-input OR gate 262, which has an output and second input coupled respectively to the data-input and Q-output terminals of a D-type latch 261. The D-type latch is clocked by the timing circuit 259 synchronously with the arrival of incoming data bytes. If any bit in any of the data bytes which occurs after the latch is reset is a logic one, the latch 261 will exhibit a logic one at its Q-output until the next reset pulse. The Q-output of latch 261 is coupled to an inverter which exhibits a zero output level whenever the latch exhibits a one output level. Thus, if after the 128 bits (16 bytes) of the header have been passed through register 250, the output of the inverter is high, then the 128 bits are zero valued. Responsive to detection of a high output level from the inverter after passage of the entitlement payload header, the circuitry 255 will generate a data write enable signal.

It has been found to be particularly efficient to partition the system such that the SCID detector, the decryptor, the addressing circuitry, the conditional access filter, and the smart card interface are all included on a single integrated circuit. This limits the number of external paths which may lead to critical timing constraints.

What is claimed is:

1. A method of processing time division multiplexed packeted TV signal program components, respective packets including a program component payload and a header containing an identifier SCID, said method comprising:

sourcing a signal containing said time division multiplexed packeted TV signal program components;

identifying SCID's of a plurality of program components of a desired program;

selecting packets containing SCID's identified with components of said desired program, and loading corresponding payloads of respective components in respective block areas of a common memory element;

reading payload data from said memory element in response to requests from respective program component processing apparatus, wherein loading corresponding payloads and accessing said memory element for reading payload data is performed alternately on a byte basis.

2. The method set forth in claim 1 further including:

decrypting respective payloads according to decryption keys associated with respective SCID's.

3. The method set forth in claim 2 wherein decryption keys are provided by a smart card responsive to entitlement information, and the entitlement information for generating decryption keys is included in payloads having a predetermined payload header, and said method further includes:

detecting said predetermined payload header, and responsive to detection of said predetermined payload headers, providing the remainder of corresponding payloads to said smart card.

4. A system for processing time division multiplexed packeted signal program components, respective packets including a program component payload and a header containing an identifier SCID, said system comprising:

a source of said time division multiplexed packeted signal;

a common buffer memory;

a plurality of program component processing apparatus having respective input ports coupled to a data output port of said common buffer memory;

a SCID detector coupled to said source for generating a plurality of control signals respective ones of which correspond to detection of a packet identified by one of a plurality of predetermined SCID's;

means for applying respective payloads of packets identified by said plurality of predetermined SCID's to a common data input port of said common buffer memory;

direct memory access circuitry, coupled to an address input port of said common buffer memory, and responsive to said control signals from said SCID detector for generating write addresses for storing respective program component payloads in mutually exclusive blocks of said common buffer memory, and responsive to data requests from said plurality of program component processing apparatus for reading corresponding program component payloads from said mutually exclusive blocks of said common buffer memory to the requesting processing apparatus; and a pointer controller for conditioning said direct memory access circuit to allocate said mutually exclusive blocks in said common buffer memory.

5. A system for processing time division multiplexed packeted signal program components, respective packets including a program component payload and a header containing an identifier SCID, said system comprising:

a source of said time division multiplexed packeted signal;

a common buffer memory;

a plurality of program component processing apparatus having respective input ports coupled to a data output port of said common buffer memory;

a SCID detector coupled to said source for detecting packets respectively identified by one of a plurality of predetermined SCID's;

means for applying respective payloads of packets identified by said plurality of predetermined SCID's to a data input port of said common buffer memory;

addressing circuitry responsive to detection of ones of said plurality of predetermined SCID's for generating write addresses for storing respective program component payloads in respective blocks of said common buffer memory, and responsive to data requests from said plurality of program component processing apparatus for reading corresponding program component payloads from said common buffer memory to the requesting processing apparatus, and arranged to alternately perform, in successive memory access operations, writing of packet payload data with read/write functions requested by said plurality of program component processing apparatus.

6. The apparatus set forth in claim 4 wherein respective payloads are encrypted with SCID specific encryption keys, and the means for applying respective payloads of packets to a data input port of said common buffer memory, comprises:

a smart card interface for interfacing a smart card designed to be responsive to entitlement data contained in predetermined received packets, for generating SCID specific decryption keys;

a signal decryptor, having an output port coupled to said data input port of said common buffer memory, for decrypting respective payloads in accordance with corresponding SCID specific decryption keys.

7. The apparatus set forth in claim 6 wherein packets containing entitlement data include payloads with payload specific headers, and said apparatus further includes:

a decoder for recognizing said payload specific headers for generating a control signal to effect loading said entitlement data in a smart card block of said common buffer memory.

8. The apparatus set forth in claim 7 further including a microprocessor for performing at least system control functions; and wherein said microprocessor is arranged to use said common buffer memory for application storage and working memory.

9. The apparatus set forth in claim 4 further including a microprocessor for performing at least system control functions; and wherein said microprocessor uses said common buffer memory for application storage and for working memory.

10. The apparatus set forth in claim 4 further including:

a detector for detecting the occurrence of lost packets of program components; and apparatus for effecting remedial action in response to detection of lost packets.

11. A system for processing time division multiplexed packeted signal program components, respective packets including a program component payload and a header containing an identifier SCID, said system comprising:

a source of said time division multiplexed packeted signal;

a microprocessor for performing at least system control functions;

a common buffer memory;

a plurality of program component processing apparatus having respective input ports coupled to a data output port of said common buffer memory;

a first multiplexer for selectively coupling payload data, data generated by said microprocessor, and data generated by ones of said plurality of program component processing apparatus to a data input port of said common buffer memory;

address generating circuitry for generating read and write addresses for at least respective program component payloads; and a second multiplexer for selectively applying memory addresses generated by said address generating circuitry, generated by said microprocessor, and generated by ones of said plurality of program component processing apparatus to a memory address port of said common buffer memory.

12. The apparatus set forth in claim 11 wherein respective payloads contain executable codes associated with applications to be executed by said microprocessor and said common buffer memory is conditioned to store said executable codes as well as data generated by said microprocessor.

13. The apparatus set forth in claim 11 further including:

a third multiplexer having respective input ports coupled to an output port of said first multiplexer and said source of said time division multiplexed packeted signal, said third multiplexer being selectively conditioned to pass payloads from said source to one of said processing apparatus without passage through said common buffer memory.

14. The apparatus set forth in claim 13 wherein respective payloads are encrypted with SCID specific encryption keys, and wherein payloads are coupled to an input port of said first multiplexer by apparatus comprising:

a smart card interface for interfacing a smart card designed to be responsive to entitlement data contained in predetermined received packets, for generating SCID specific decryption keys;

a signal decryptor, having an output port coupled to said input port of said first multiplexer, for decrypting respective payloads in accordance with corresponding SCID specific decryption keys.

15. The apparatus set forth in claim 14 further including apparatus responsive to SCID's in respective packets for directing corresponding packet payloads to designated areas in said common buffer memory.

\* \* \* \* \*